US009223905B2

(12) United States Patent
Dalgas et al.

(10) Patent No.: US 9,223,905 B2
(45) Date of Patent: Dec. 29, 2015

(54) SYSTEMS AND METHODS FOR PREDICTING FLUID DYNAMICS IN A DATA CENTER

(75) Inventors: Mikkel Dalgas, Sjoelund (DK); James W. VanGilder, Pepperell, MA (US); Christopher Healey, Chelmsford, MA (US); Martin Johansen, Vejle (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 587 days.

(21) Appl. No.: 13/194,570

(22) Filed: Jul. 29, 2011

(65) Prior Publication Data
US 2012/0245905 A1 Sep. 27, 2012

Related U.S. Application Data

(60) Provisional application No. 61/467,920, filed on Mar. 25, 2011.

(51) Int. Cl.
*G06F 7/60* (2006.01)
*G06F 17/10* (2006.01)
*G06F 17/50* (2006.01)
*H05K 7/20* (2006.01)

(52) U.S. Cl.
CPC ........ *G06F 17/5004* (2013.01); *G06F 17/5009* (2013.01); *H05K 7/20836* (2013.01); *G06F 2217/16* (2013.01)

(58) Field of Classification Search
None
See application file for complete search history.

(56) References Cited

U.S. PATENT DOCUMENTS

| 4,823,290 A | 4/1989 | Fasack et al. |
| 5,095,712 A | 3/1992 | Narreau |
| 5,216,623 A | 6/1993 | Barrett et al. |
| 5,367,670 A | 11/1994 | Ward et al. |

(Continued)

FOREIGN PATENT DOCUMENTS

| CN | 1485906 A | 3/2004 |
| WO | 2008144375 A2 | 11/2008 |
| WO | 2009/014893 A1 | 1/2009 |

OTHER PUBLICATIONS

"Case Study, Application of TileFlow to Improve Cooling in a Data Center," Innovative Research, Inc., 2004.

(Continued)

*Primary Examiner* — Omar Fernandez Rivas
*Assistant Examiner* — Bernard E Cothran
(74) *Attorney, Agent, or Firm* — Lando & Anastasi LLP

(57) ABSTRACT

A system and method for predicting airflow within a data center using a potential flow technique is provided. In one aspect, a method includes automatically generating an unstructured grid, the unstructured grid comprising a plurality of unstructured grid cells, each unstructured grid cell having a size, dividing a representation of the data center into the plurality of unstructured grid cells, determining airflow velocity values for each of the plurality of unstructured grid cells using airflow velocity potentials, determining a temperature value for each one of the plurality of the unstructured grid cells using the airflow velocity values, determining a concentration value for each of the plurality of the unstructured grid cells using the airflow velocity values, and calculating a comparison result indicating whether the concentration values, the airflow velocity values and the temperature values for the plurality of the unstructured grid cells satisfy convergence criteria.

22 Claims, 13 Drawing Sheets

(56) References Cited

U.S. PATENT DOCUMENTS

| | | | |
|---|---|---|---|
| 5,410,448 A | 4/1995 | Barker, III et al. | |
| 5,581,478 A | 12/1996 | Cruse et al. | |
| 5,718,628 A | 2/1998 | Nakazato et al. | |
| 5,735,134 A | 4/1998 | Liu et al. | |
| 6,018,497 A * | 1/2000 | Gunasekera | 367/72 |
| 6,055,480 A | 4/2000 | Nevo et al. | |
| 6,134,511 A | 10/2000 | Subbarao | |
| 6,216,956 B1 | 4/2001 | Ehlers et al. | |
| 6,246,969 B1 | 6/2001 | Sinclair et al. | |
| 6,494,050 B2 | 12/2002 | Spinazzola et al. | |
| 6,574,104 B2 | 6/2003 | Patel et al. | |
| 6,672,955 B2 | 1/2004 | Charron | |
| 6,718,277 B2 | 4/2004 | Sharma | |
| 6,745,579 B2 | 6/2004 | Spinazzola et al. | |
| 6,827,142 B2 | 12/2004 | Winkler et al. | |
| 7,020,586 B2 | 3/2006 | Snevely | |
| 7,031,870 B2 | 4/2006 | Sharma et al. | |
| 7,051,946 B2 | 5/2006 | Bash et al. | |
| 7,085,133 B2 | 8/2006 | Hall | |
| 7,148,796 B2 | 12/2006 | Joy et al. | |
| 7,251,547 B2 | 7/2007 | Bash et al. | |
| 7,313,503 B2 | 12/2007 | Nakagawa et al. | |
| 7,315,448 B1 | 1/2008 | Bash et al. | |
| 7,365,973 B2 | 4/2008 | Rasmussen et al. | |
| 7,366,632 B2 | 4/2008 | Hamann et al. | |
| 7,378,165 B2 | 5/2008 | Brignone et al. | |
| 7,403,391 B2 | 7/2008 | Germagian et al. | |
| 7,426,453 B2 | 9/2008 | Patel et al. | |
| 7,472,043 B1 | 12/2008 | Low et al. | |
| 7,558,649 B1 | 7/2009 | Sharma et al. | |
| 7,568,360 B1 | 8/2009 | Bash et al. | |
| 7,596,476 B2 | 9/2009 | Rasmussen et al. | |
| 7,620,480 B2 | 11/2009 | Patel et al. | |
| 7,676,280 B1 | 3/2010 | Bash et al. | |
| 7,726,144 B2 | 6/2010 | Larson et al. | |
| 7,799,474 B2 | 9/2010 | Lyon et al. | |
| 7,832,925 B2 | 11/2010 | Archibald et al. | |
| 7,881,910 B2 | 2/2011 | Rasmussen et al. | |
| 7,885,795 B2 | 2/2011 | Rasmussen et al. | |
| 7,908,126 B2 | 3/2011 | Bahel et al. | |
| 7,979,250 B2 | 7/2011 | Archibald et al. | |
| 8,155,922 B2 | 4/2012 | Loucks | |
| 8,219,362 B2 | 7/2012 | Shrivastava et al. | |
| 8,244,502 B2 | 8/2012 | Hamann et al. | |
| 8,249,825 B2 | 8/2012 | VanGilder et al. | |
| 8,425,287 B2 | 4/2013 | Wexler | |
| 8,473,265 B2 | 6/2013 | Hlasny et al. | |
| 8,509,959 B2 | 8/2013 | Zhang et al. | |
| 2001/0034588 A1 * | 10/2001 | Agrawals et al. | 703/2 |
| 2001/0042616 A1 | 11/2001 | Baer | |
| 2002/0043969 A1 | 4/2002 | Duncan et al. | |
| 2002/0071031 A1 | 6/2002 | Lord et al. | |
| 2002/0149911 A1 | 10/2002 | Bishop et al. | |
| 2003/0115000 A1 | 6/2003 | Bodas | |
| 2003/0115024 A1 | 6/2003 | Snevely | |
| 2003/0158718 A1 | 8/2003 | Nakagawa et al. | |
| 2004/0020224 A1 | 2/2004 | Bash et al. | |
| 2004/0065097 A1 | 4/2004 | Bash et al. | |
| 2004/0065104 A1 | 4/2004 | Bash et al. | |
| 2004/0075984 A1 | 4/2004 | Bash et al. | |
| 2004/0089009 A1 | 5/2004 | Bash et al. | |
| 2004/0089011 A1 | 5/2004 | Patel et al. | |
| 2004/0189161 A1 | 9/2004 | Davis et al. | |
| 2004/0240514 A1 | 12/2004 | Bash et al. | |
| 2004/0262409 A1 | 12/2004 | Crippen et al. | |
| 2005/0023363 A1 | 2/2005 | Sharma et al. | |
| 2005/0267639 A1 | 12/2005 | Sharma et al. | |
| 2006/0080001 A1 | 4/2006 | Bash et al. | |
| 2006/0096306 A1 | 5/2006 | Okaza et al. | |
| 2006/0115586 A1 | 6/2006 | Xing et al. | |
| 2006/0214014 A1 | 9/2006 | Bash et al. | |
| 2006/0267974 A1 * | 11/2006 | Kato et al. | 345/419 |
| 2007/0078635 A1 | 4/2007 | Rasmussen et al. | |
| 2007/0121295 A1 | 5/2007 | Campbell et al. | |
| 2007/0171613 A1 | 7/2007 | McMahan et al. | |
| 2007/0174024 A1 | 7/2007 | Rasmussen et al. | |
| 2007/0190919 A1 | 8/2007 | Donovan et al. | |
| 2007/0274035 A1 | 11/2007 | Fink et al. | |
| 2008/0041076 A1 | 2/2008 | Tutunoglu et al. | |
| 2008/0104985 A1 | 5/2008 | Carlsen | |
| 2008/0174954 A1 | 7/2008 | VanGilder et al. | |
| 2008/0180908 A1 | 7/2008 | Wexler | |
| 2009/0030554 A1 | 1/2009 | Bean, Jr. et al. | |
| 2009/0138313 A1 | 5/2009 | Morgan et al. | |
| 2009/0138888 A1 | 5/2009 | Shah et al. | |
| 2009/0150123 A1 | 6/2009 | Archibald et al. | |
| 2009/0223234 A1 | 9/2009 | Campbell et al. | |
| 2009/0259343 A1 | 10/2009 | Rasmussen et al. | |
| 2009/0326879 A1 * | 12/2009 | Hamann et al. | 703/2 |
| 2010/0106464 A1 | 4/2010 | Hlasny et al. | |
| 2010/0256959 A1 | 10/2010 | VanGilder et al. | |
| 2010/0286956 A1 | 11/2010 | VanGilder et al. | |
| 2010/0287018 A1 | 11/2010 | Shrivastava et al. | |
| 2011/0040529 A1 | 2/2011 | Hamann et al. | |
| 2012/0071992 A1 | 3/2012 | VanGilder et al. | |
| 2012/0158387 A1 | 6/2012 | VanGilder et al. | |
| 2012/0170205 A1 | 7/2012 | Healey et al. | |
| 2013/0006426 A1 | 1/2013 | Healey et al. | |

OTHER PUBLICATIONS

"Management Strategy for Network Critical Physical Infrastructure", White Paper #100, pp. 110, American Power Conversion, Dec. 15, 2003, published on World Wide Web.

Abi-Zadeh, Davar et al., "A Transient Analysis of Environmental Conditions for a Mission Critical Facility after a Failure of Power", Arup Mission Criticial Facilities, Feb. 2001, pp. 1-12.

Ahmad, Jasim U. et al, "Navier-Stokes simulation of air-conditioning facility of a large modern computer room," Jun. 2005, Proceedings of the 2005 ASME Fluids Engineering Division Summer Meeting and Exhibition, pp. 1-6.

Anderson, Donald, "Iterative Procedures for Nonlinear Integral Equations," Journal of the Association for Computing Machinery, vol. 12, No. 4, Oct. 1965, pp. 547-560.

APC Users Guide Brochure, "InfraStruXure Manager," Mar. 2004, 181 pgs.

Ashrae, "Thermal Guidelines for Data Processing Environments" 2004, Atlanta: American Society of Heating, Refrigerating, and Air-Conditioning Engineers, Inc., 2004, Atlanta.

Bash, C.E., Patel, C.D., and Sharma, R.K., "Efficient Thermal Management of Data Centers—Immediate and Long-Term Research Needs" Intl. J. Heat, Ventilating, Air-Conditioning and Refrigeration Research, 2003, pp. 137-152, vol. 9, No. 2.

Beitelmal et al., "Thermo-Fluids Provisioning of a High Performance High Density Data Center", Apr. 22, 2006, Springer Science and Business Media, Inc, Distributed and Parallel Databases, 21, pp. 227-238 DOI:1 0.1 007/s1 0619-005-0413-0.

Chandrakant D. Patel, et al., "Thermal Considerations in Cooling Large Scale High Copute Density Data Centers" IEEE 2002, pp. 767-776.

Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.

Ehsan Pakabaznia et al., "Miminizing data center cooling and server power costs", Proceedings of the 14th ACM/IEEE International Symposium on Low Power Electronics and Design, ISLPED '09, Jan. 1, 2009, p. 145, XP55015368, New York, New York, USA, DOI: 101145/1594233.1594268, ISBN: 978-1-60-558684-7.

Herrlin, M.K., "Rack Cooling Effectiveness in Data Centers and Telecom Central Offices: The Rack Cooling Index (RCI)," ASHRAE Transaction, 2005, pp. 725-731, vol. 111(2).

Innovative Research, Inc., http://web.archive.org/web/20051221005029/http://www.inres.com/, Dec. 21, 2005, published on World Wide Web.

International Search Report for PCT/US2006/16739 mailed Oct. 3, 2006.

International Search Report for PCT/US2008/051908 mailed Jul. 3, 2008.

(56) References Cited

OTHER PUBLICATIONS

Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007, pp. 193-225, XP019499845, ISSN: 1573-7578, DOI:10.1007/S10619-006-7007-3.

Jeonghwan Choi et al., "A CFD-Based Tool for Studying Temperature in Rack-Mounted Servers", IEEE Transactions on Computers, IEEE Service Center, Los Alamitos, CA, US, vol. 57, No. 8, Aug. 1, 2008, pp. 1129-1142, ISSN: 0018-9340, DOI: 10.1109/TC.2008.52.

K. Dunlap, "Cooling Audit for Identifying Potential Cooling Problems in Data Centers", White Paper #40, pp. 1-18, American Power Conversion, May 20, 2004, published on World Wide Web.

Karki et al., "Techniques for controlling airflow distribution in raised-floor data centers," ASME 2003.

Marwah, M.; Sharma, R.; Shih, R.; Patel, C.; Bhatia, V.; Mekanapurath, M.; Velumani, R.; Velayudhan, S., 2009, Data analysis, visualization and knowledge discovery in sustainable data centers, in Proceedings of the 2nd Bangalore Annual Compute Conference (Compute '09).

N. Rasmussen, "Calculating Total Cooling Requirements for Data Centers", White Paper #25, pp. 1-8, American Power Conversion, May 20, 2004, published on World Wide Web.

N. Rasmussen, "Cooling Strategies for Ultra-High Density Racks and Blade Servers", White Paper #46, pp. 1-22, American Power Conversion, Mar. 29, 2005, published on World Wide Web.

N. Rasmussen, "Strategies for Deploying Blade Servers in Existing Data Centers", White Paper #125, pp. 1-14, American Power Conversion, Mar. 29, 2005, published on World Wide Web.

Pakbaznia, E.; Ghasemazar, M.; Pedram, M.:, "Temperature-aware dynamic resource provisioning in a power-optimized datacenter," Design, Automation & Test in Europe Conference & Exhibition (DATE), 2010, vol., No., pp. 124-129, Mar. 8-12, 2010.

Refai-Ahmed G. et al., "Analysis of flow distribution in power supply using flow network modeling (FNM)", Thermal and Thermomechanical Phenomena in Electronic Systems, 2000, ITHERM 2000, The Seventh Intersociety Conference on May 23-26, 2000, Piscataway, NJ, USA, IEEE, Piscataway, NJ, USA, vol. 1, May 23, 2000, pp. 90-98, ISBN: 978-0-7803-5912-3.

Sharma, R.K, Bash, C.E., and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.

Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.

Shrivastava S.K. et al., "A flow-network model for predicting rack cooling in containment systems", Proceedings of the ASME Interpack Conference—2009: Presented At 2009 ASME Interpack Conference, Jul. 19-23, 2009, San Francisco, California, USA, vol. 2, Jul. 19, 2009, pp. 785-791.

Toulouse M.M. et al., "Exploration of a potential-flow-based compact model of air-flow transport in data centers", Proceedings of the ASME International Mechanical Engineering Congress and Exposition—2009: Presented at 2009 ASME International Mechanical Engineering Congress and Exposition, Nov. 13-19, 2009, Lake Buena Vista, Florida, USA, vol. 13: New Del, vol. 13, Jan. 1, 2009, pp. 41-50, DOI: 10.1115/IMECE2009-10806, ISBN: 978-0-7918-4386-4.

Vanessa Lopez et al., "Measurement-based modeling for data centers", Thermal and Thermomechanical Phenomena in Electronic Systems (ITHERM), 2010 12th IEEE Intersociety Conference on, IEEE, Piscataway, NJ, USA, Jun. 2, 2010, pp. 1-8, XP031702357.

Vangilder et al., "Airflow Uniformity thourhg Perforated Tiles in a Raised-Floor Data Center", White Paper 121, Jul. 17-22, 2005, 10 pages.

Vangilder, James W. et al., "Caputure index: an airflow-based rack cooling performance metric," 2007, ASHRAE Transactions, vol. 113, pp. 126-136.

Vangilder, James W. et al., "Real-Time prediction of rack-cooling performance," 2006, ASHRAE Transactions, vol. 112, pp. 151-162.

Healey, C., et al., "Potential-Flow Modeling for Data Center Applications," Proceedings of the ASME 2011 Pacific Rim Technical Conference & Exposition on Packaging and Integration of Electronic and Photonic Systems, IPACK2011-52136, Jul. 6-8, 2011.

Chen, Q.and Srebric, J., "Simplified Diffuser Boundary Conditions for Numerical Room Airflow Models," Final Report for ASHRAE RP-1009, Department of Architecture, Massachusetts Institute of Technology, Cambridge, MA, 2000, 181 pages.

\* cited by examiner

SYSTEMS AND METHODS FOR PREDICTING FLUID DYNAMICS IN A DATA CENTER

BACKGROUND

1. Technical Field

At least one example relates generally to systems and methods for data center management and design, and more specifically, to systems and methods for predicting airflow dynamics in a data center.

2. Discussion of Related Art

In response to the increasing demands of information-based economies, information technology networks continue to proliferate across the globe. One manifestation of this growth is the centralized network data center. A centralized network data center typically consists of various information technology equipment, collocated in a structure that provides network connectivity, electrical power and cooling capacity. Often the equipment is housed in specialized enclosures termed "racks" which integrate these connectivity, power and cooling elements. In some data center configurations, these rows are organized into hot and cool aisles to decrease the cost associated with cooling the information technology equipment. A raised floor having an air plenum beneath the floor is typically used for providing cooling air to the racks. Cool air is distributed from the air plenum to the racks through perforated tiles having open areas.

Various processes and software applications have been developed to aid data center personnel in designing and maintaining efficient and effective data center configurations. These tools often guide data center personnel through activities such as designing the data center structure, positioning equipment within the data center prior to installation and repositioning equipment after construction and installation are complete. Thus, conventional tool sets provide data center personnel with a standardized and predictable design methodology.

SUMMARY

According to a first aspect, a computer-implemented method for predicting airflow within a data center using a potential flow technique is provided. The method includes acts of automatically generating, by a computer, an unstructured grid, the unstructured grid comprising a plurality of unstructured grid cells, each unstructured grid cell having a size, dividing, by the computer, a representation of the data center into the plurality of unstructured grid cells, determining, by the computer, airflow velocity values for each of the plurality of unstructured grid cells using airflow velocity potentials, determining, by the computer, a temperature value for each one of the plurality of the unstructured grid cells using the airflow velocity values, determining, by the computer, a concentration value for each of the plurality of the unstructured grid cells using the airflow velocity values; and calculating, by the computer, a comparison result indicating whether the concentration values, the airflow velocity values and the temperature values for the plurality of the unstructured grid cells satisfy convergence criteria.

In the method, automatically generating the unstructured grid may include generating a plurality of computational grid cells, some computational grid cell of the plurality of computational grid cells having one of a first size and a second size, the first size being larger than the second size, generating a plurality of visualization cells corresponding to the plurality of computational grid cells, dividing visualization cells of the plurality of visualization cells having the first size into sets of visualization cells having the second size; and displaying the plurality of visualization cells in a visualization plane.

The method may further comprise the act of assigning a plurality of transition values for a subset of the plurality of visualization cells based on a location of each of the plurality of visualization cells included in the subset, the subset including at least one boundary cell and at least on interior cell. In addition, the method may further comprise the act of calculating a new smoothing value for the at least one boundary cell from an original value of the at least one boundary cell and an original value of the at least one interior cell adjacent to the at least one boundary cell.

In the method, the act of calculating the new transition value may further include the act of calculating a scale of the original value of the at least one interior cell adjacent to the at least one boundary cell. In the method, the act of calculating the new transition value may further include calculating a scale of an original values of the at least one boundary cell. In the method, the act of calculating the new transition value may further include calculating a scale of an original values of the at least one boundary cell and the original value of the at least one interior cell adjacent to the at least one boundary cell. The method may further comprise the act of assigning the plurality of transition values to the subset of the plurality of visualization cells to smooth at least one of predicted airflow values and predicted temperature values. The method may further comprise the acts of determining at least one metric using the concentration values, the airflow velocity values and the temperature values, storing the at least one metric, and displaying the at least one metric in a graphical representation of the data center superimposed over a plurality of racks and a plurality of coolers.

In addition, the method may further comprise displaying, in a graphical representation of the data center, at least one of the predicted airflow values and the predicted temperature values for each of the plurality of visualization cells in a visualization plane. In the method, the act of calculating the comparison result may further include determining the concentration values, the airflow velocity values and the temperature values for the plurality of unstructured grid cells using iterative methods. In the method, the act of calculating the comparison result may further include performing the iterative methods until the concentration values, the airflow velocity values and the temperature values satisfy the convergence criteria, wherein the convergence criteria includes a difference between a total power value for racks and a load value for coolers, the racks and coolers being located in the data center. The method may further comprise the acts of determining the convergence criteria for concentrations as a function of a number of airflow objects being located in the data center, wherein the function includes 0.5 percent of a total airflow for mass conservation and 0.5 percent of total power output for energy conservation, and wherein the airflow objects include racks and coolers.

According to another aspect, a system for predicting airflow within a data center using a potential flow technique is provided. The system may include an interface and a controller coupled to the interface and configured to automatically generate an unstructured grid, the unstructured grid comprising a plurality of unstructured grid cells, each unstructured grid cell having a size, divide a representation of the data center into the plurality of unstructured grid cells, determine airflow velocity values for each of the plurality of unstructured grid cells using airflow velocity potentials, determine a temperature value for each one of the plurality of the unstructured grid cells using the airflow velocity values, determine a concentration value for each of the plurality of the unstructured grid cells using the airflow velocity values, and calculate a comparison result indicating whether the concentration values, the airflow velocity values and the temperature values for the plurality of the unstructured grid cells satisfy convergence criteria.

In the system, the controller may be further configured to generate a plurality of computational grid cells, some computational grid cells of the plurality of computational grid cells having one of a first size and a second size, the first size being larger than the second size, generate a plurality of visualization cells corresponding to the plurality of computational grid cells, divide visualization cells of the plurality of visualization cells having the first size into sets of visualization cells having the second size, and display the plurality of visualization cells in a visualization plane. The controller may be further configured to assign a plurality of transition values for a subset of the plurality of visualization cells based on a location of each of the plurality of visualization cells included in the subset, the subset including at least one boundary cell and at least on interior cell. In addition, the controller may be further configured to calculate a new transition value for the at least one boundary cell from an original value of the at least one interior cell adjacent to the at least one boundary cell.

In the system, the controller may be further configured to calculate a scale of the original value of the at least one interior cell adjacent to the at least one boundary cell. The controller may be further configured to calculate a scale of an original values of the at least one boundary cell. The controller may be further configured to calculate a scale of an original values of the at least one boundary cell and the original value of the at least one interior cell adjacent to the at least one boundary cell.

In the system, the controller may be further configured to assign the plurality of transition values to the subset of the plurality of visualization cells to smooth at least one of predicted airflow values and predicted temperature values. The controller may be further configured to determine at least one metric using the concentration values, the airflow velocity values and the temperature values and store the at least one metric. The interface may be further configured to display the at least one metric in a graphical representation of the data center. The at least one metric may be superimposed over a plurality of racks and a plurality of coolers in the graphical representation. The interface may be further configured to display, in a graphical representation of the data center, at least one of the predicted airflow values and the predicted temperature values for each of the plurality of visualization cells in a visualization plane.

In the system, the controller may be further configured to calculate the comparison result by determining the concentration values, the airflow velocity values and the temperature values for the plurality of unstructured grid cells using iterative methods until the concentration values, the airflow velocity values and the temperature values satisfy the convergence criteria. The convergence criteria may include a difference between a total power value for racks and a load value for coolers, the racks and coolers being located in the data center. The controller may be further configured to determine the convergence criteria for concentrations as a function of a number of airflow objects being located in the data center, wherein the function includes 0.5 percent of a total airflow for mass conservation and 0.5 percent of total power output for energy conservation, and wherein the airflow objects include racks and coolers.

Another to another aspect, a computer-readable medium having stored thereon sequences of instruction including instructions that will cause a processor to automatically generate an unstructured grid, the unstructured grid comprising a plurality of unstructured grid cells, each unstructured grid cell having a size, divide a representation of the data center into the plurality of unstructured grid cells, determine airflow velocity values for each of the plurality of unstructured grid cells using airflow velocity potentials, determine a temperature value for each one of the plurality of the unstructured grid cells using the airflow velocity values, determine a concentration value for each of the plurality of the unstructured grid cells using the airflow velocity values, and calculate a comparison result indicating whether the concentration values, the airflow velocity values and the temperature values for the plurality of the unstructured grid cells satisfy convergence criteria.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
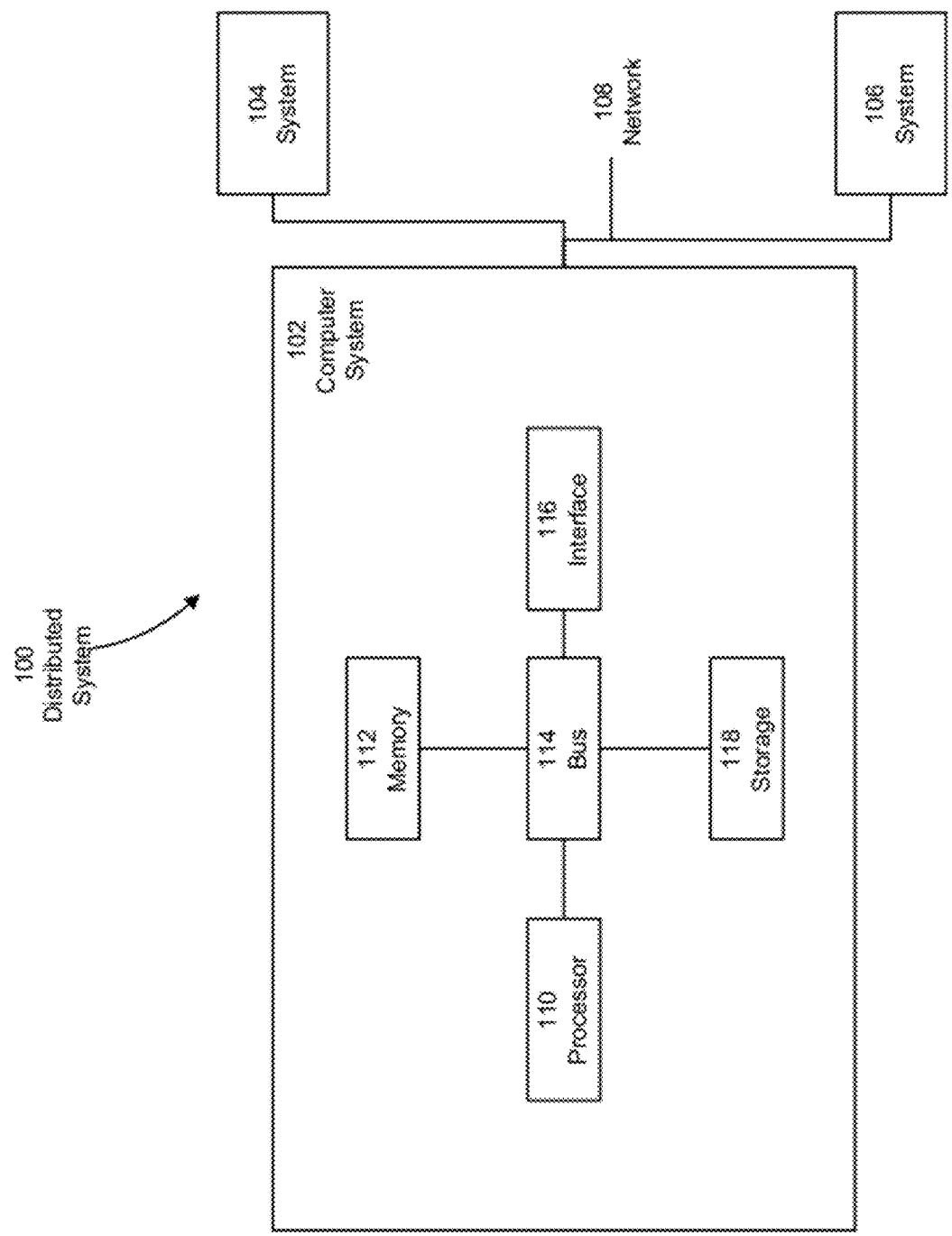
FIG. 1 shows an example computer system with which various aspects disclosed herein may be implemented.

At least some examples relate to systems and processes through which a user may design new data center configurations and analyze, modify, manage and control existing configurations. These systems may facilitate this activity by allowing the user to create models of data center configurations from which performance metrics may be determined. Both the systems and the user may employ these performance metrics to determine alternative data center configurations that meet various design objectives. Further, in at least one example, a system provides prediction of data center airflow for a proposed layout of a data center equipment and also provides prediction of data center airflow for an installed data center.

As described in U.S. patent application Ser. No. 12/019,109, titled "System and Method for Evaluating Equipment Rack Cooling", filed Jan. 24, 2008 (referred to herein as "the '109 Application"), and in U.S. patent application Ser. No. 11/342,300, titled "Methods and Systems for Managing Facility Power and Cooling" filed Jan. 27, 2006 (referred to herein as "the '300 application"), both of which are assigned to the assignee of the present application, and both of which are hereby incorporated herein by reference in their entirety, typical equipment racks in modern data centers draw cooling air in front of the rack and exhaust air out the rear of the rack. The equipment racks, and in-row coolers are typically arranged in rows in an alternating front/back arrangement creating alternating hot and cool aisles in a data center with the front of each row of racks facing the cool aisle and the rear of each row of racks facing the hot aisle. Adjacent rows of equipment racks separated by a cool aisle may be referred to as a cool aisle cluster, and adjacent rows of equipment racks separated by a hot aisle may be referred to as a hot aisle cluster. As readily apparent to one of ordinary skill in the art, a row of equipment racks may be part of one hot aisle cluster and one cool aisle cluster. In descriptions and claims herein, equipment in racks, or the racks themselves, may be referred to as cooling consumers, and in-row cooling units and/or computer room air conditioners (CRACs) may be referred to as cooling providers. In the referenced applications, tools are provided for analyzing the cooling performance of a cluster of racks in a data center. In these tools, multiple analyses may be performed on different layouts to attempt to optimize the cooling performance of the data center.

In a typical data center that uses CRACs to provide cooling, airflow output from the CRACs is typically distributed to equipment racks using an under-floor plenum. The CRACs pump cool air into the plenum, and the air exits the plenum through perforated floor tiles which are typically located in front of equipment racks. For facilities employing a hot aisle/cool aisle design, the perforated tiles are typically contained in the cool aisles.

It is known to use commercially available Computational Fluid Dynamics (CFD) based software programs, such as "FLOVENT" available from Mentor Graphics Corporation, to conduct analyses of the airflows. However, these programs are typically extremely expensive, slow to run, and require special expertise to operate.

At least some examples described herein are directed to tools and methods by which data center airflow performance may be estimated in real time or near real time using common computers. The tools and methods may be used in conjunction with both data center design tools and with data center management tools and do not require users with a high degree of expertise in fluid dynamics.

The aspects disclosed herein are not limited in their application to the details of construction and the arrangement of components set forth in the following description or illustrated in the drawings. These aspects are capable of assuming other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other example.

For instance, according to one example, a computer system is configured to perform any of the functions described herein, including but not limited to, configuring, modeling and presenting information regarding specific data center configurations. Further, computer systems in examples of the data center may be used to automatically measure environmental parameters in a data center, and control equipment, such as chillers or coolers to optimize performance. Moreover, the systems described herein may be configured to include or exclude any of the functions discussed herein. Thus examples are not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, examples are not limited to executing on any particular system or group of systems. Further, aspects may be implemented in software, hardware or firmware, or any combination thereof. Thus, aspects may be implemented within methods, acts, systems, system elements and components using a variety of hardware and software configurations, and examples are not limited to any particular distributed architecture, network, or communication protocol.

FIG. 1 shows a block diagram of a distributed computer system 100, in which various aspects and functions may be practiced. Distributed computer system 100 may include one or more computer systems. For example, as illustrated, distributed computer system 100 includes computer systems 102, 104 and 106. As shown, computer systems 102, 104 and 106 are interconnected by, and may exchange data through, communication network 108. Network 108 may include any communication network through which computer systems may exchange data. To exchange data using network 108, computer systems 102, 104 and 106 and network 108 may use various methods, protocols and standards, including, among others, token ring, ethernet, wireless ethernet, Bluetooth, TCP/IP, UDP, Http, FTP, SNMP, SMS, MMS, SS7, JSON, Soap, and Corba. To ensure data transfer is secure, computer systems 102, 104 and 106 may transmit data via network 108 using a variety of security measures including TLS, SSL or VPN among other security techniques. While distributed computer system 100 illustrates three networked computer systems, distributed computer system 100 may include any number of computer systems and computing devices, networked using any medium and communication protocol.

Various aspects and functions disclosed herein may be implemented as specialized hardware or software executing in one or more computer systems including computer system 102 shown in FIG. 1. As depicted, computer system 102 includes processor 110, memory 112, bus 114, interface 116 and storage 118. Processor 110 may perform a series of instructions that result in manipulated data. Processor 110 may be a commercially available processor such as an Intel Pentium, Motorola PowerPC, SGI MIPS, Sun UltraSPARC, or Hewlett-Packard PA-RISC processor, but may be any type of processor or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any storage device for storing data, such as a disk drive or other non-volatile, non-transitory, storage device. Various examples may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI and InfiniBand. Thus, bus 114 enables communications, for example, data and instructions, to be exchanged between system components of computer system 102.

Computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable nonvolatile, non-transitory storage medium in which instructions are stored that define a program to be executed by the processor. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor or some other controller may cause data to be read from the nonvolatile, non-transitory recording medium into another memory, such as memory 112, that allows for faster access to the information by the processor than does the storage medium included in storage system 118. The memory may be located in storage system 118 or in memory 112, however, processor 110 may manipulate the data within the memory 112, and then copies the data to the medium associated with storage system 118 after processing is completed. A variety of components may manage data movement between the medium and integrated circuit memory element and examples are not limited thereto. Further, examples are not limited to a particular memory system or storage system.

Although computer system 102 is shown by way of example as one type of computer system upon which various aspects and functions may be practiced, aspects are not limited to being implemented on the computer system as shown in FIG. 1. Various aspects and functions may be practiced on one or more computers having different architectures or components than that shown in FIG. 1. For instance, computer system 102 may include specially-programmed, special-purpose hardware, such as for example, an application-specific integrated circuit (ASIC) tailored to perform a particular operation disclosed herein, while another example may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and examples are not limited to any particular implementation.

The processor and operating system together define a computer platform for which application programs in high-level programming languages may be written. These component applications may be executable, intermediate, for example, C-, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, examples are not limited to a specific programming language and any suitable programming language could also be used. Further, in at least one example, the tool may be implemented using VBA Excel.

A computer system included within an example may perform additional functions. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of Uppsala, Sweden or integration software such as Web Sphere middleware from IBM of Armonk, N.Y. However, a computer system running, for example, SQL Server may be able to support both aspects disclosed herein and databases for sundry other applications.

Example System Architecture

Figure 2:
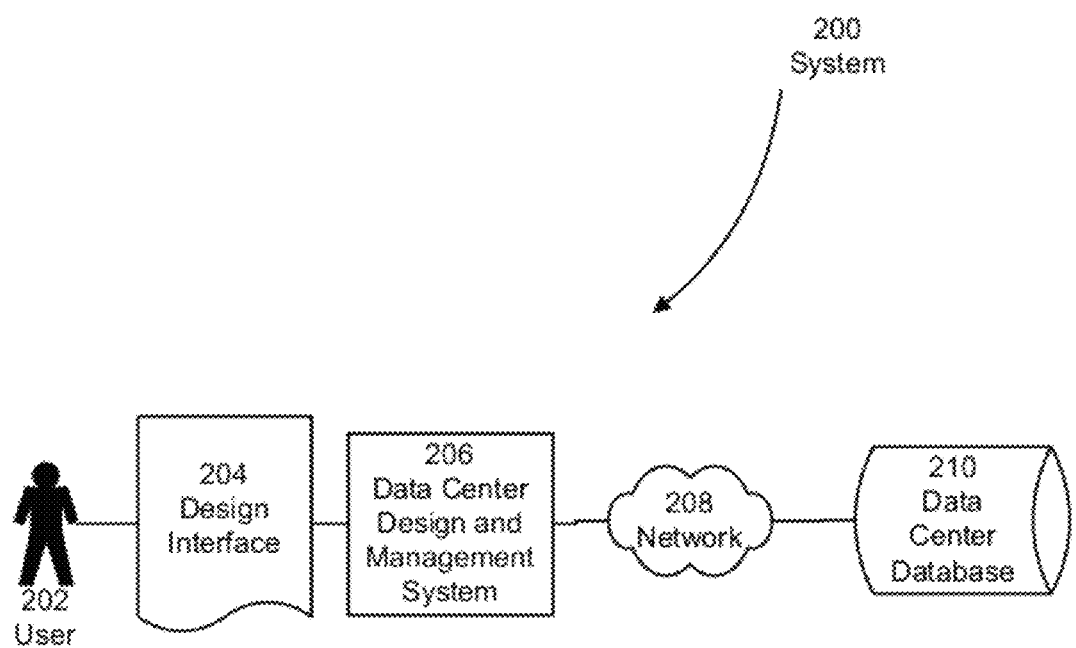
FIG. 2 illustrates an exemplary distributed system configured to model data center fluid dynamics.

FIG. 2 presents a context diagram including physical and logical elements of distributed system 200. As shown, distributed system 200 is specially configured in accordance with a particular example. The system structure and content recited with regard to FIG. 2 is for exemplary purposes only and is not intended to limit examples to the specific structure shown in FIG. 2. As will be apparent to one of ordinary skill in the art, many variant system structures can be architected without deviating from the scope of the examples disclosed herein. The particular arrangement presented in FIG. 2 was chosen to promote clarity.

Information may flow between the elements, components and subsystems depicted in FIG. 2 using any technique. Such techniques include, for example, passing the information over the network via TCP/IP, passing the information between modules in memory and passing the information by writing to a file, database, or some other non-volatile storage device. Other techniques and protocols may be used without departing from the scope of the examples disclosed herein.

Referring to FIG. 2, system 200 includes user 202, interface 204, data center design and management system 206, communications network 208 and data center database 210. System 200 may allow user 202, such as a data center architect or other data center personnel, to interact with interface 204 to create or modify a model of one or more data center configurations. According to one example, interface 204 may include aspects of the floor editor and the rack editor as disclosed in Patent Cooperation Treaty Application No. PCT/US08/63675, entitled METHODS AND SYSTEMS FOR MANAGING FACILITY POWER AND COOLING, filed on May 15, 2008, which is incorporated herein by reference in its entirety, and is hereinafter referred to as PCT/US08/63675. In other examples, interface 204 may be implemented with specialized facilities that enable user 202 to design, in a drag and drop fashion, a model that includes a representation of the physical layout of a data center or any subset thereof. This layout may include representations of data center structural components, including raised floor plenum characteristics, as well as data center equipment. The features of interface 204, as may be found in various examples are discussed further below. In at least one example, information regarding a data center is entered into system 200 through the interface, and assessments and recommendations for the data center are provided to the user. Further, in at least one example, optimization processes may be performed to optimize cooling performance and energy usage of the data center.

As shown in FIG. 2, data center design and management system 206 presents data design interface 204 to user 202. According to one example, data center design and management system 206 may include the data center design and management system as disclosed in PCT/US08/63675. In this example, design interface 204 may incorporate functionality of the input module, the display module and the builder module included in PCT/US08/63675 and may use the database module to store and retrieve data.

As illustrated, data center design and management system 206 may exchange information with data center database 210 via network 208. This information may include any information required to support the features and functions of data center design and management system 206. For example, in one example, data center database 210 may include at least some portion of the data stored in the data center equipment database described in PCT/US08/63675. In another example, this information may include any information required to support interface 204, such as, among other data, the physical layout of one or more data center model configurations, the production and distribution characteristics of the cooling providers included in the model configurations, the consumption characteristics of the cooling consumers in the model configurations, and a listing of equipment racks and cooling providers to be included in a cluster.

In one example, data center database 210 may store types of cooling providers, the amount of cool air provided by each type of cooling provider, and a temperature of cool air provided by the cooling provider. Thus, for example, data center database 210 includes records of a particular type of CRAC unit that is rated to deliver airflow at the rate of 5,600 cfm at a temperature of 68 degrees Fahrenheit. In addition, the data center database 210 may store one or more cooling metrics, such as inlet and outlet temperatures of the CRACs and inlet and outlet temperatures of one or more equipment racks. The temperatures may be periodically measured and input into the system, or in other examples, the temperatures and airflows may be continuously monitored using devices coupled to the system 200. Further in some examples, for installed data centers, actual airflow measurements from one or more perforated tiles may be used by a system to improve accuracy of one of the processes described herein. Still further, the measured airflow may be used by a system in one example as a check against calculated airflows, and when a difference between measured and calculated exceeds a preset threshold, a warning may be initiated to alert an operator of the system.

Data center database 210 may take the form of any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 2, which include data center design and management system 206, network 208 and data center equipment database 210, each may include one or more computer systems. Further, the system in FIG. 2 may also connect to one or more devices in a data center, including components of the cooling system or power distribution system to control and monitor these systems. As discussed above with regard to FIG. 1, computer systems may have one or more processors or controllers, memory and interface devices. The particular configuration of system 200 depicted in FIG. 2 is used for illustration purposes only and examples may be practiced in other contexts. Thus, examples are not limited to a specific number of users or systems.

In at least one example, which will now be described, a tool is provided that predicts in real-time the airflow throughout a data center. The tool utilizes novel methods of modeling the data center and simplifying analysis of the models to predict real-time airflow performance. The ability to predict performance in real-time or near real-time allows the tool to be used to quickly analyze several possible solutions and consider various design trade-offs. As discussed further below, the tool can be used as a stand-alone trade-off tool, incorporated in a data center design system, or incorporated as part of a data center management system.

Potential Flow Method (PFM)

The Potential Flow Method is a physics-based technique used in one example to compute the data center airflow patterns. The PFM operates under the assumption that airflow is incompressible and irrotational. For airflow which can be modeled as incompressible and irrotational, the airflow pattern may be determined from Poisson's Equation as shown in Equation (1).

$$\nabla^2 \phi = S''' \quad (1)$$

where $S'''$ is a volumetric-flow-rate source per unit volume and $\phi$ is the velocity potential, related to the x, y and z-velocity components is as shown in Equation (2).

$$u = \frac{\partial \varphi}{\partial x}, v = \frac{\partial \varphi}{\partial y}, w = \frac{\partial \varphi}{\partial z} \quad (2)$$

In the absence of a source term, Equation (1) reduces to Laplace's Equation, $\nabla^2 \phi = 0$. Irrotational flows are frictionless and thus the airflow "slips" along air-solid interfaces. Consequently, airflow boundary conditions consistent with the PFM approach are: 1) prescribed normal velocities at the faces of flow objects like racks and coolers, 2) no "penetration" of airflow into solid surfaces in the normal direction, and 3) "slip" parallel to solid surfaces. No pressure calculations are required in PFM. However, a method for coupling pressure to the airflow prediction could be used to model certain flow boundary conditions, such as perforated tiles, that depend on pressure. One such method that uses the Bernoulli Equation is described in U.S. patent application Ser. No, 12/884,832, entitled "SYSTEM AND METHOD FOR PREDICTING PERFORATED TILE AIRFLOW IN A DATA CENTER", filed Sep. 17, 2010, which is incorporated herein by reference in its entirety.

Once the airflow velocities are determined, temperatures may be determined using the energy Equation (3).

$$\vec{V} \cdot \nabla T = \alpha \nabla^2 T \quad (3)$$

where $\alpha = k/(\rho c_p)$ is the thermal diffusivity. In practice, the diffusion term on the right-hand side of Equation (3) can be neglected in favor of the dominant convection terms; however, retaining the diffusion term adds the additional degree of freedom, $\alpha$, which could be "tuned" to affect the accuracy of the predictions from the PFM.

The Capture Index (CI) metrics provide quantitative measurements of fundamental rack inlet and exhaust airflow patterns and are, therefore, useful in assessing the quality of the predictions of the PFM. To compute CIs, we must track the concentration of a passive mass species downstream from rack and cooler outlets. The mass species equation, Equation (4), expressed as a mass concentration $C_1$ of species 1 is analogous to the temperature equation, Equation (3).

$$\vec{V} \cdot \nabla C_1 = D \nabla^2 C_1 \quad (4)$$

where D is the mass diffusivity of species $C_1$ into the primary fluid (air). To be "passive," species $C_1$ is assumed to have the properties of air and D, therefore, represents the diffusivity of air into air. As with the temperature prediction, the diffusion term on the right-hand side of the Equation (4) can be neglected in favor of the more dominant convection terms. However, again, the additional degree of freedom afforded by D offers the potential to further "tune" PFM predictions.

These equations may appear simple; however, the complex boundary conditions for a real data center application make analytical solutions of equations either impossible or very difficult and not very general. In one example, which will now be described, a numerical solution to the problem uses a Finite Differencing method. Following this method, the physical problem space to be analyzed is divided into a number of grid cells. In some examples, the grid of cells is a structured Cartesian grid. In other examples, the grid is an unstructured grid. Unstructured grids can provide significant advantages. For instance, in one example, a two-dimensional unstructured Cartesian grid scheme implemented for a potential-flow analysis of data center airflow provided virtually identical results to structured grid cells of equal or even much smaller average size. One process for automatically generating an unstructured grid is discussed further below with reference to FIG. 4.

For each grid cell, algebraic approximations of Equations (1), (3), and (4) are formulated. Scalar values such as velocity potentials, temperatures, and concentrations are calculated at the center (node) of each cell while velocities are computed at each cell face. According to one example, these scalar values are solved iteratively using a standard technique such as the Gauss-Seidel method as described in *Advanced Engineering Mathematics*, by E. Kreyszig Seventh Edition. 1993. John Wiley & Sons, New York. p. 986. In this method, the unknown associated with each grid cell is written explicitly on the left-hand side of the equation. An initial guess is made for all unknowns and then the guesses are improved by considering each equation in turn, marching through all grid cells. For each grid cell equation, the most-recently computed values of all unknowns are always used. The solver keeps sweeping through all grid cell equations until the unknowns no longer change, the convergence criteria is satisfied or a fixed iteration limit has been reached.

In at least one example, the convergence criteria is satisfied where the measurement of error transgresses a threshold of approximately one-half percent of an appropriate data center scale (for example, total room airflow for mass balance, total energy added to the room for energy balance and a function of the number of airflow objects in the room for species conservation). As referred to herein, an "airflow object" is any object with an airflow inlet or exhaust. Examples of airflow objects include tiles, cooler, racks, ceiling returns, and CRAC returns. The measurement of error may be any norm of the vector of absolute error: maximum absolute error over all grid cells, the sum of absolute error, the square root of the sum of squared absolute errors, etc. The thresholds used are very important for efficiency and accuracy. A threshold that is very difficult to attain will waste computational resources and time. Weak thresholds may provide inaccurate flow fields.

Figure 3:
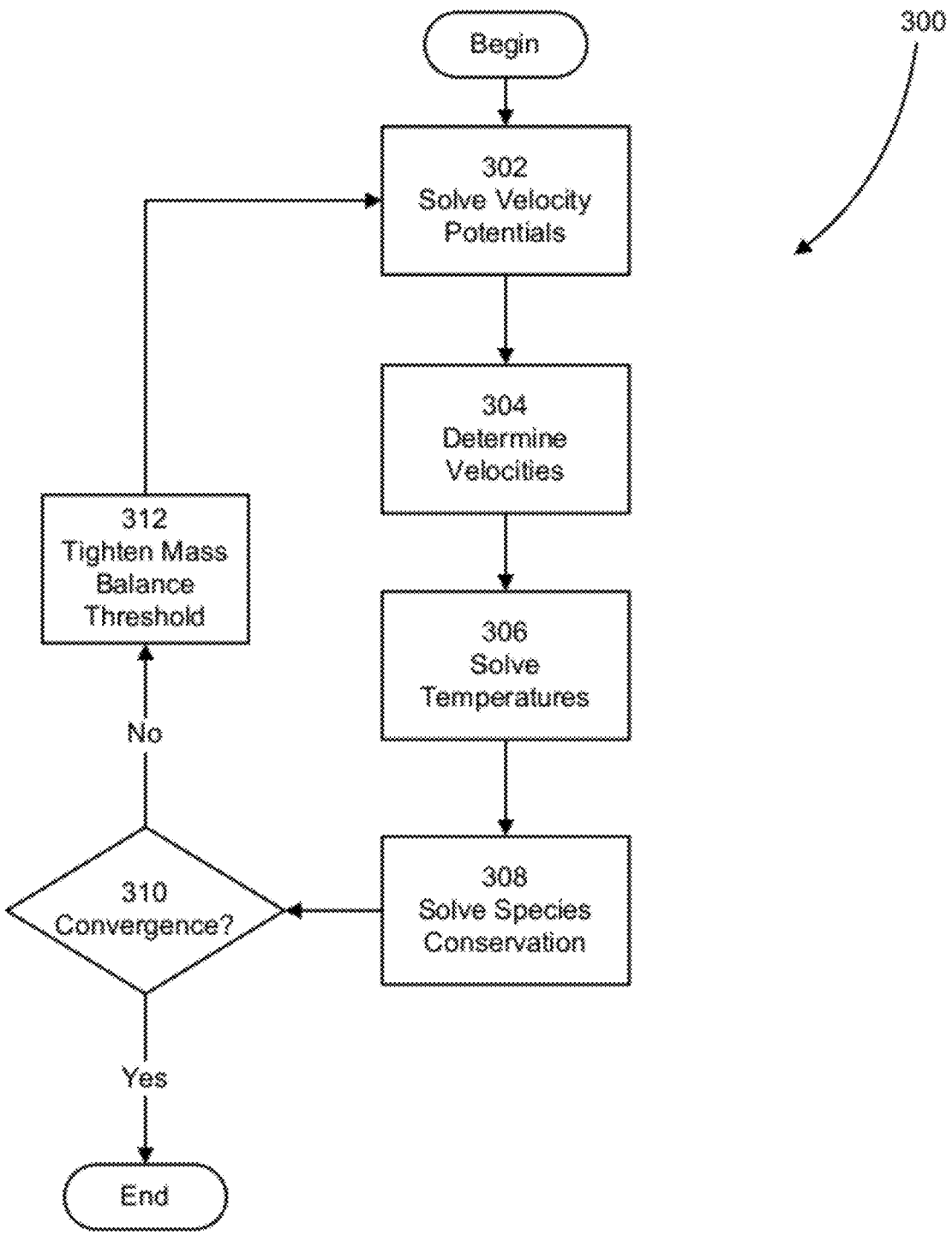
FIG. 3 shows a process of determining fluid dynamics in accordance with one example.

According to one example, a computer system, such as the data center design and management system 206 described above, implements the PFM. FIG. 3 illustrates a PFM process 300 in accord with this example. As shown in act 302 of FIG. 3, the computer system first solves the velocity potential equations of the grid cells iteratively until satisfying a specified mass balance error threshold, which is a function of the total room airflow. Once the velocity potential field is determined, the computer system next determines velocities in act 304. In act 306, the computer system solves the temperature equations of the grid cells iteratively, using the calculated grid cell boundary velocities, until satisfying a specified energy balance error threshold, which is a function of the total energy added to the room. Alternatively, in the act 306, the computer system may solve the temperature equations of the grid cells iteratively, using the calculated grid cell boundary velocities, until the difference between the rack loads and the cooler return loads satisfies a specified error threshold of the total energy added to the room. In act 308, the computer system also solves species conservation equations of the grid cells iteratively (as indicated by capture index) until satisfying a specified species conservation error threshold, which is a function of the number of airflow objects occupying the room using the calculated grid cell velocities.

In act 310, the computer system determines whether the convergence criteria used in the acts 306 and 308 was met. If so, the computer system terminates the process 300. If not, in act 312, the computer system either configures the act 302 to execute an additional number of iterations or tightens the mass balance threshold and returns to the act 302 to execute additional velocity potential iterations. In this way the process 300 gains additional precision with which to re-execute the acts 304 through 308, thereby increasing the likelihood that convergence will occur in both of the acts 306 and 308. Thus, the process 300 provides a robust method that will employ multiple iterations through the velocity potential equations, where appropriate to deliver accurate and timely results.

Automatic Generation of Unstructured Grids for Data Centers

Figure 4:
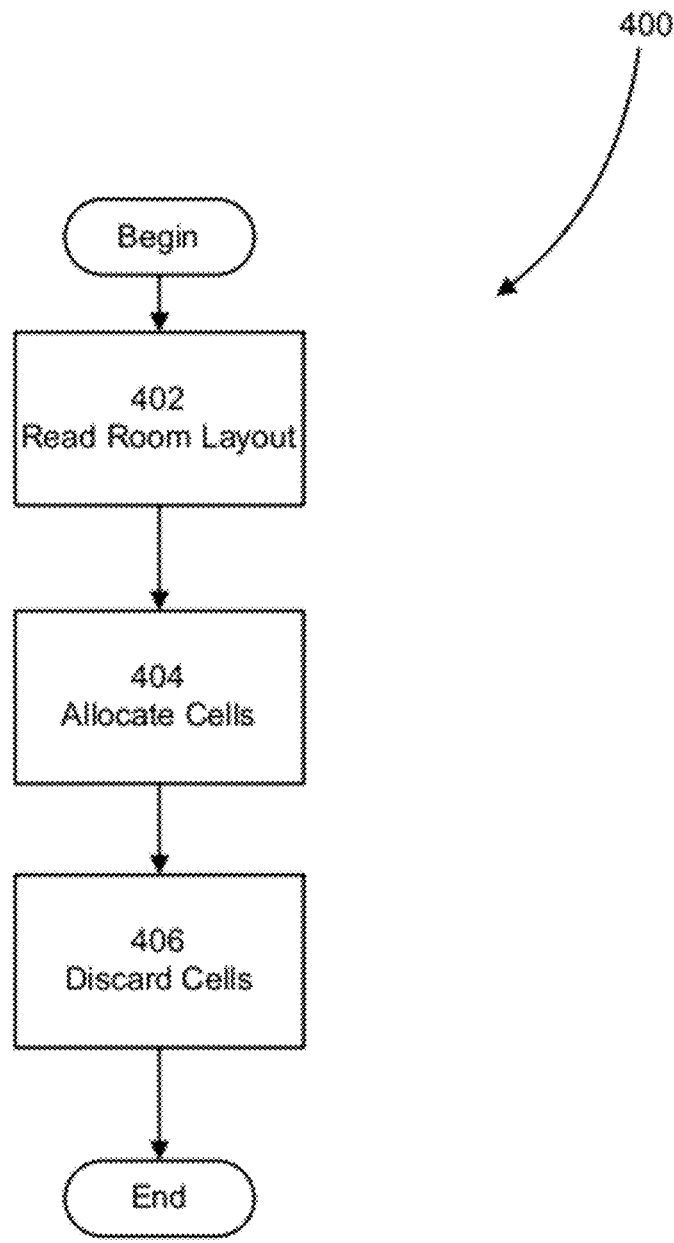
FIG. 4 shows a process of automatically generating an unstructured grid in accordance with one example.

As discussed above, unstructured or variable grid structures can provide significant computational advantages. According to some examples, a specially configured computer system, such as the data center design and management system 206 described above, implements a process to automatically generate three-dimensional unstructured grids within modeled data center rooms. FIG. 4 illustrates a grid (i.e. a computational grid) generation process 400 in accord with these examples.

As shown in FIG. 4, a computer system executing the process 400 begins by reading information representing the physical layout of a data center room in act 402. This layout information may represent a variety of characteristics associated with the room and the objects housed therein. Examples of these characteristics include, among others, the dimensions of the room, walled off portions within the room (referred to herein as cutouts), equipment racks, information technology equipment deployed within the equipment racks, CRACs, UPSs, PDUs, raised floor characteristics, perforated tiles in the room and in-row cooling equipment.

In act 404, the computer system allocates the modeled space described by the layout information into a grid of cells. In some examples, this grid of cells is a three-dimensional, unstructured Cartesian grid. In the illustrated example, the computer system constructs the grid cells with an aspect ratio of 1 (cuboidal). In addition, according to the illustrated example, the computer system assigns each cell a size of small (representing approximately 6 inches in each dimension), medium (representing approximately 1 foot in each dimension) or large (representing approximately 2 foot in each dimension). Other examples may use other grid structures and grid cell sizes and examples are not limited to a specific grid or grid cell structure.

Further, in some examples of the act 404, the computer system allocates the grid cells using a modified octree method, that begins with larger sized cells that are subdivided into smaller cells to provide refinement where required (such as near walls, airflow objects, cutouts, heat sources, etc.) and to provide a standardized transition from smaller to larger cells. In other examples, the computer system also uses a smaller size for cells that border on inlets or exhausts of airflow objects or heat sources on walls, cutouts, or non-airflow objects. This approach ensures that a certain level of granularity is preserved near flow sources and sinks. In act 406, the computer system discards grid cells that fall within objects or cutouts.

Interpolation of Field Values Within the Unstructured Grid

Figure 5:
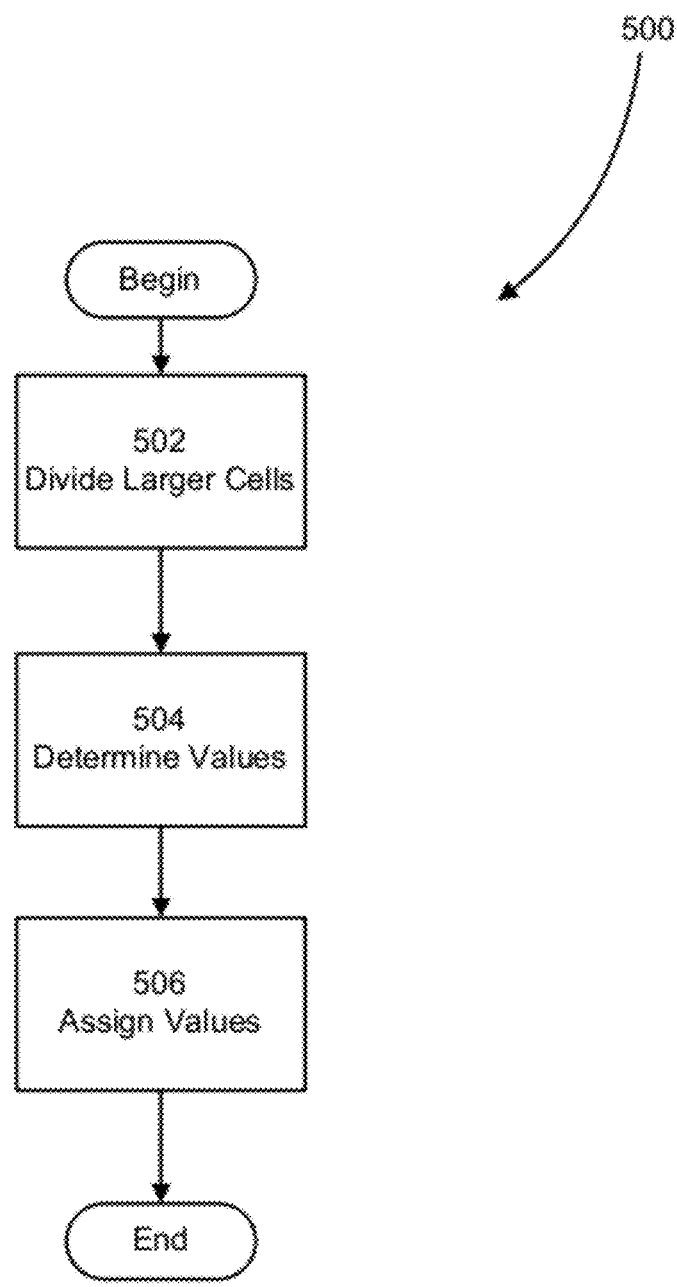
FIG. 5 illustrates a process of smoothing grid cell values in accordance with one example.

The unstructured grid can provide a challenge for realistic visualization of results. While the unstructured grid (i.e. computational grid) provides physically correct values for the flow and temperature fields, the interaction of large-sized cells with smaller-sized cells can create discontinuities which detract from the user experience. Therefore, after completing the grid based PFM analysis, some examples implement a technique to smooth the transitions between grid cells. These examples paint a more intuitive representation of the airflow and temperature fields. FIG. 5 illustrates a smoothing process 500 in accord with these examples.

As shown in FIG. 5, a computer system executing the process 500 begins by dividing larger grid cells (i.e. computational cells) into smaller cells (i.e. visualization cells). What constitutes "larger" and "smaller" may vary between examples. For instance, according to one example, a grid cell 2 feet in width can be subdivided into cells having widths of 6 inches. In this situation, the grid cell would have 8 interior cells and 56 boundary cells. In other examples, a grid cell 1 foot in width or less may be subdivided for smoothing purposes and examples are not limited to smoothing a particular grid cell size.

In act 504, the computer system determines values to assign to cells that will result in gradual (smooth) transitions between grid cells. These values may be determined using a variety of processes. For instance, in one example, values are determined only for boundary cells. According to this example, interior cells are not affected by the smoothing process 500.

Further, a computer system executing the act 504 may calculate values for boundary cells using a variety of methods that result in a value that is a combination of the value of the boundary cell and the values of neighboring cells. For instance, in one example, the value of any boundary cell is a weighted average of its parent grid cell's value and the values of other grid cells that border the boundary cell. In this example, the weight given a particular grid cell's value is directly proportional to the distance of that grid cell from the boundary cell. Other examples may employ other smoothing calculations and examples are not limited to a particular smoothing calculation.

Figure 12:
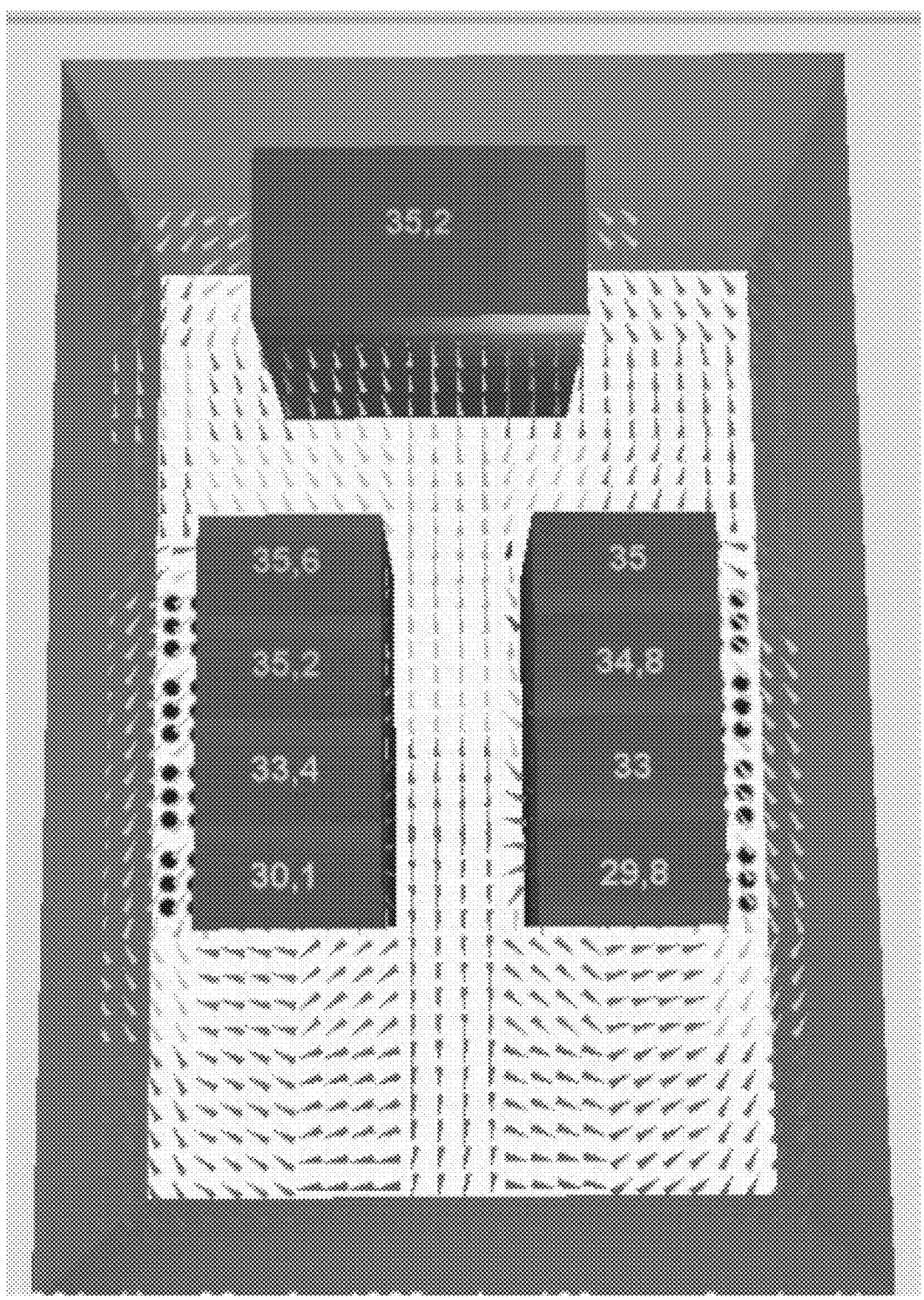
FIG. 12 illustrates a display of airflow values in accordance with one example.
Figure 13:
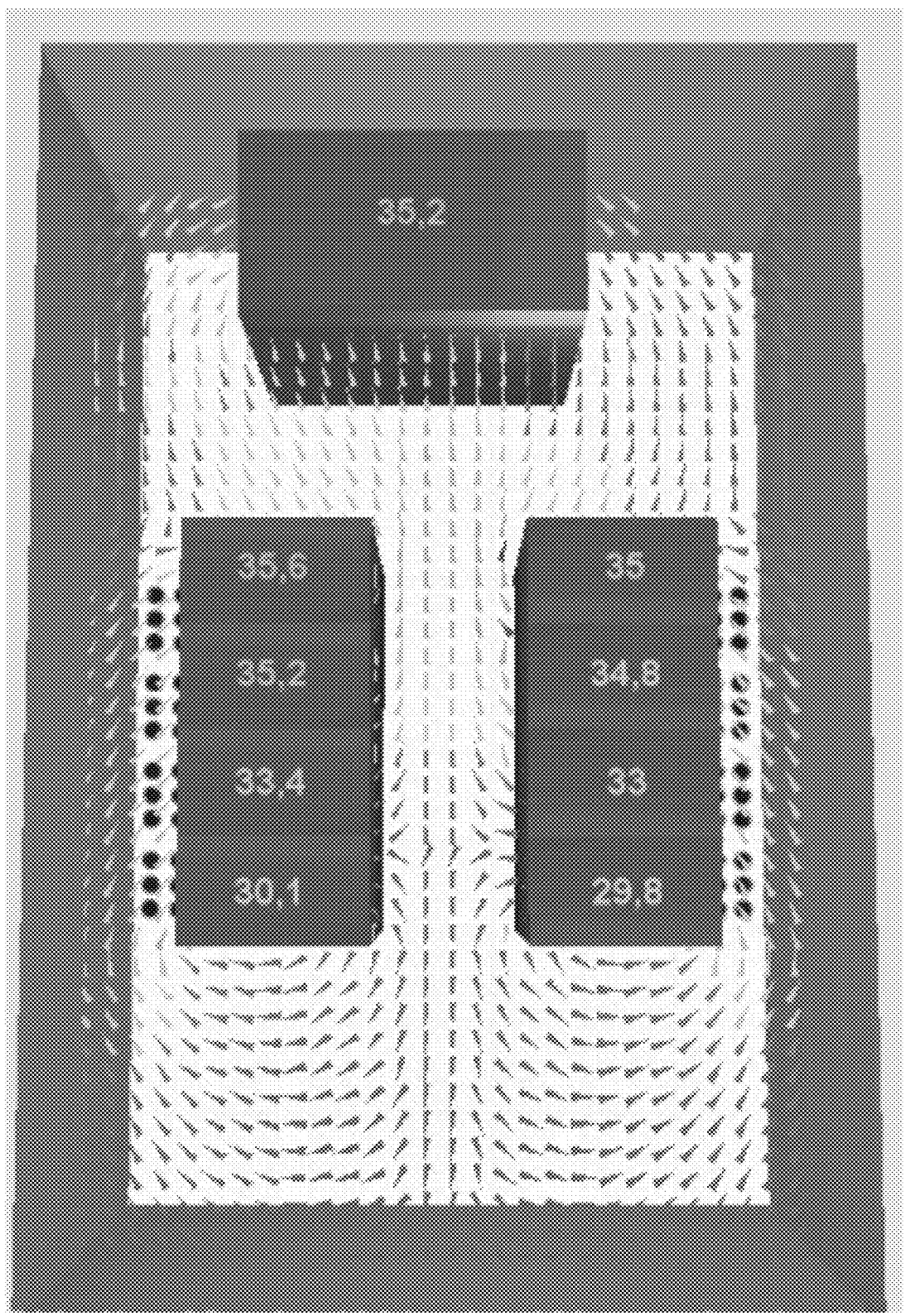
FIG. 13 illustrates another display of airflow values in accordance with one example.

In act 506, the computer system assigns the smoothed values to the boundary cells. Next, the computer system terminates the process 500. Processes like the process 500 enable the computer system to display smoothed and user friendly visualizations of flows determined by the PFM for a data center room. FIG. 12 illustrates a display of airflow values prior to execution of the process 500. FIG. 13 illustrates a display of airflow values after execution of the process 500.

Visualization of Performance Data for Racks and Coolers

Figure 6:
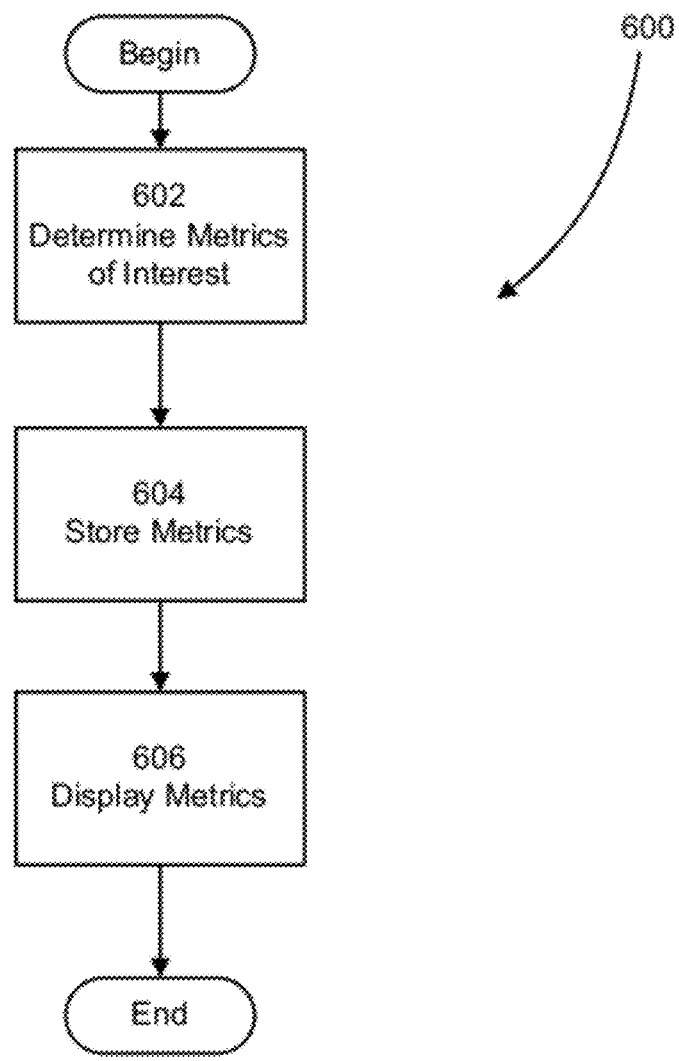
FIG. 6 illustrates a process of display metrics of interest in a 3-dimensional representation of a data center room in accordance with one example.

According to some examples, a computer system, such as the data center design and management system 206 described above, implements a process that determines and displays performance measures for data center equipment, such as racks and coolers, within the 3D tool. FIG. 6 illustrates a display process 600 in accord with this example. As shown in FIG. 6, a computer system executing the process 600 receives metrics of interest in act 602. For racks, these metrics may include average inlet temperatures, maximum inlet temperatures, load, total airflow, hot aisle capture index, and cold aisle capture index. For coolers, these metrics may include average return temperatures, maximum return temperatures, load, and total airflow. Characteristics of other data center equipment may be received and examples are not limited to particular metrics or metrics regarding particular equipment.

Figure 7:
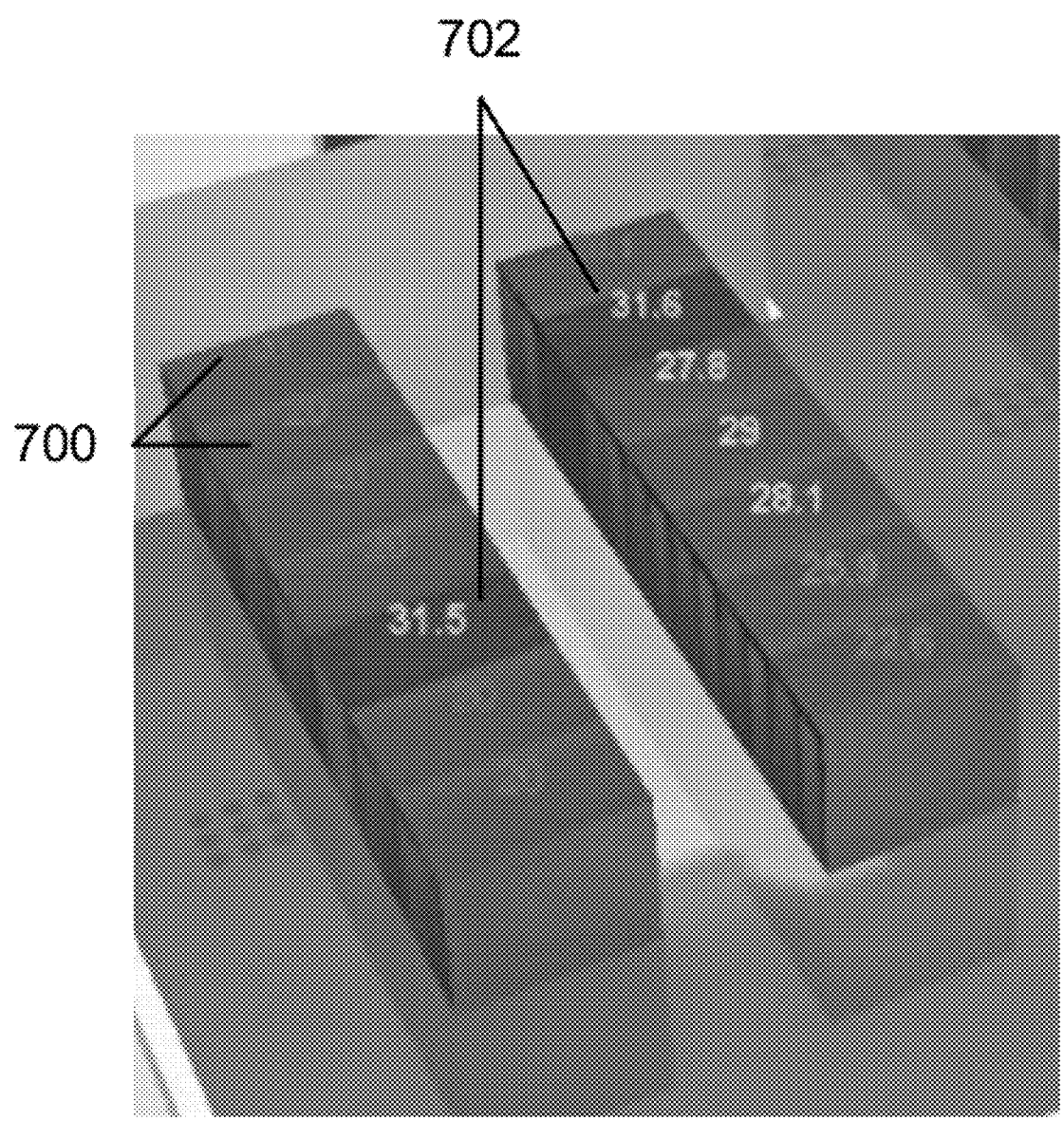
FIG. 7 shows a 3-dimensional display including metrics of interest in accordance with one example.
Figure 8:
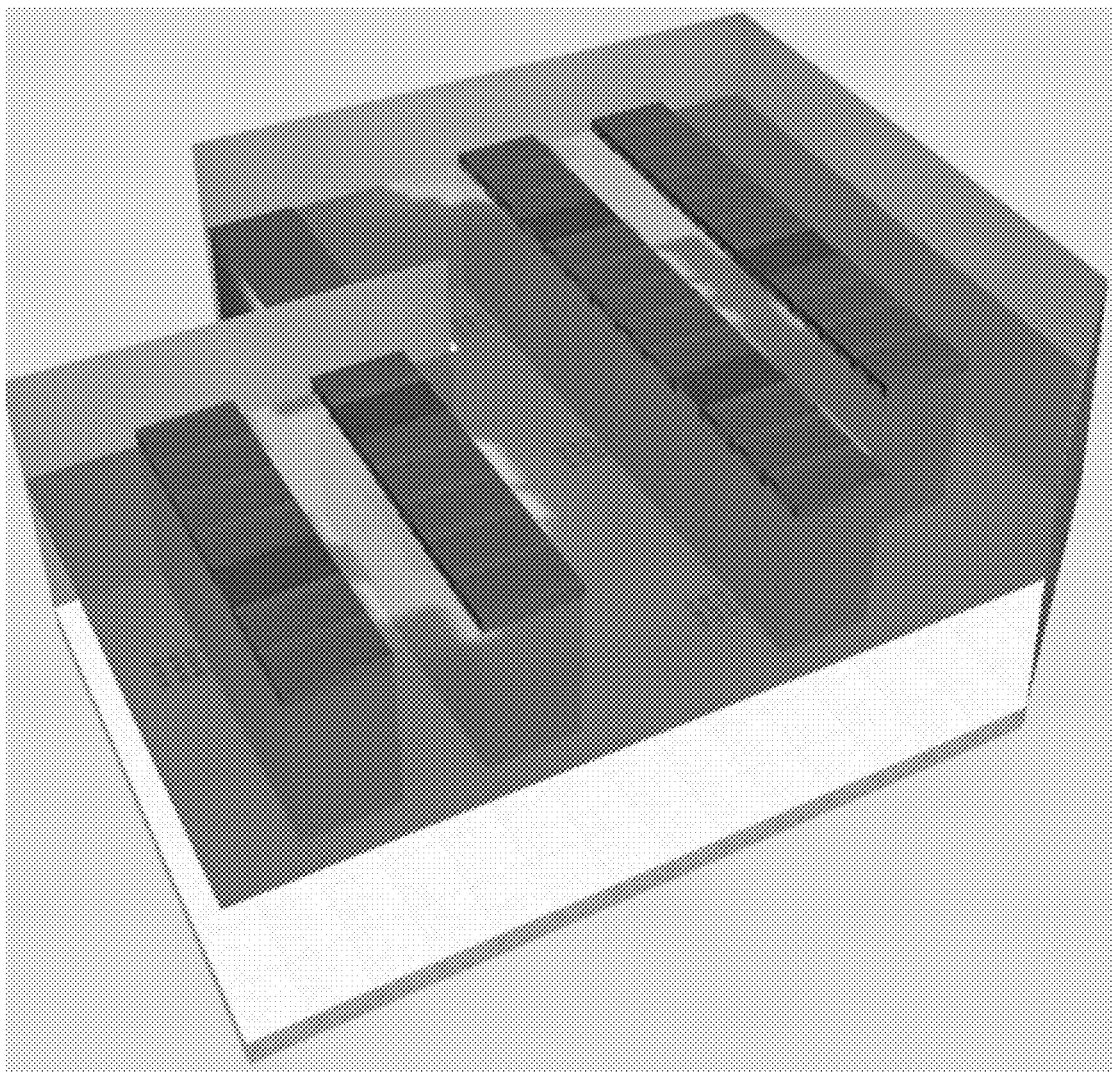
FIG. 8 illustrates a representation of a temperature plane in accordance with one example.
Figure 9:
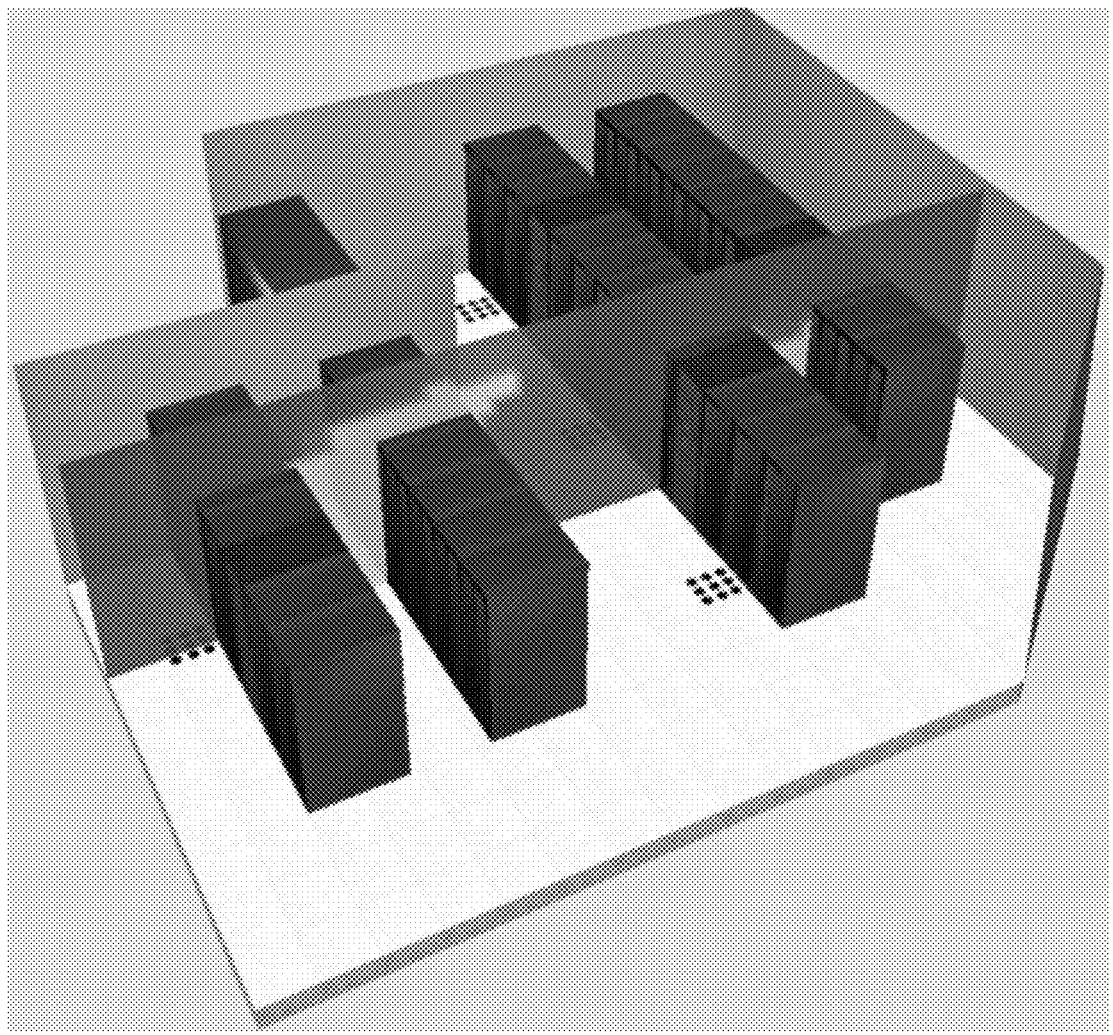
FIG. 9 illustrates another representation of a temperature plane in accordance with one example.
Figure 10:
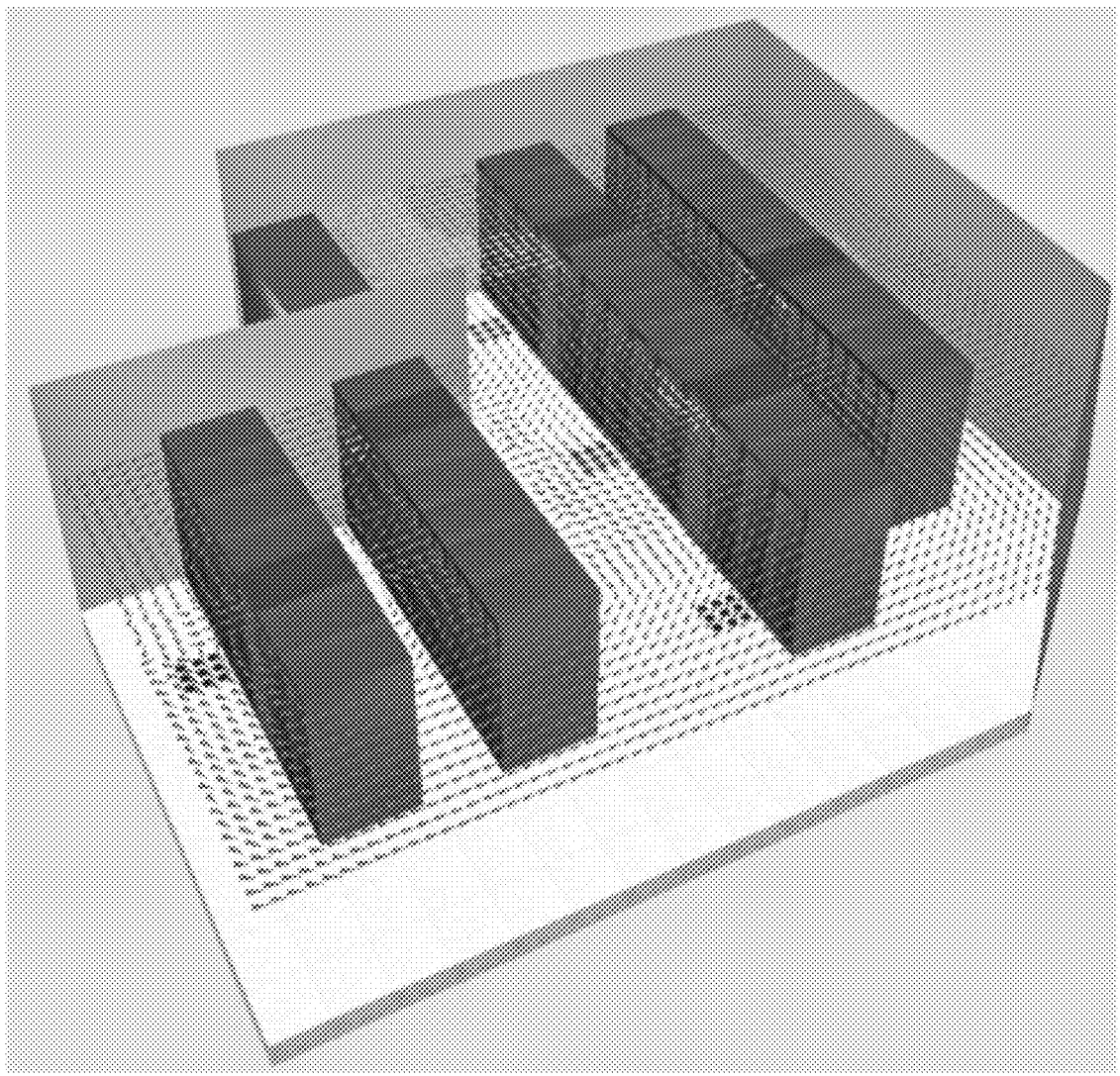
FIG. 10 illustrates a representation of an airflow plane in accordance with one example.
Figure 11:
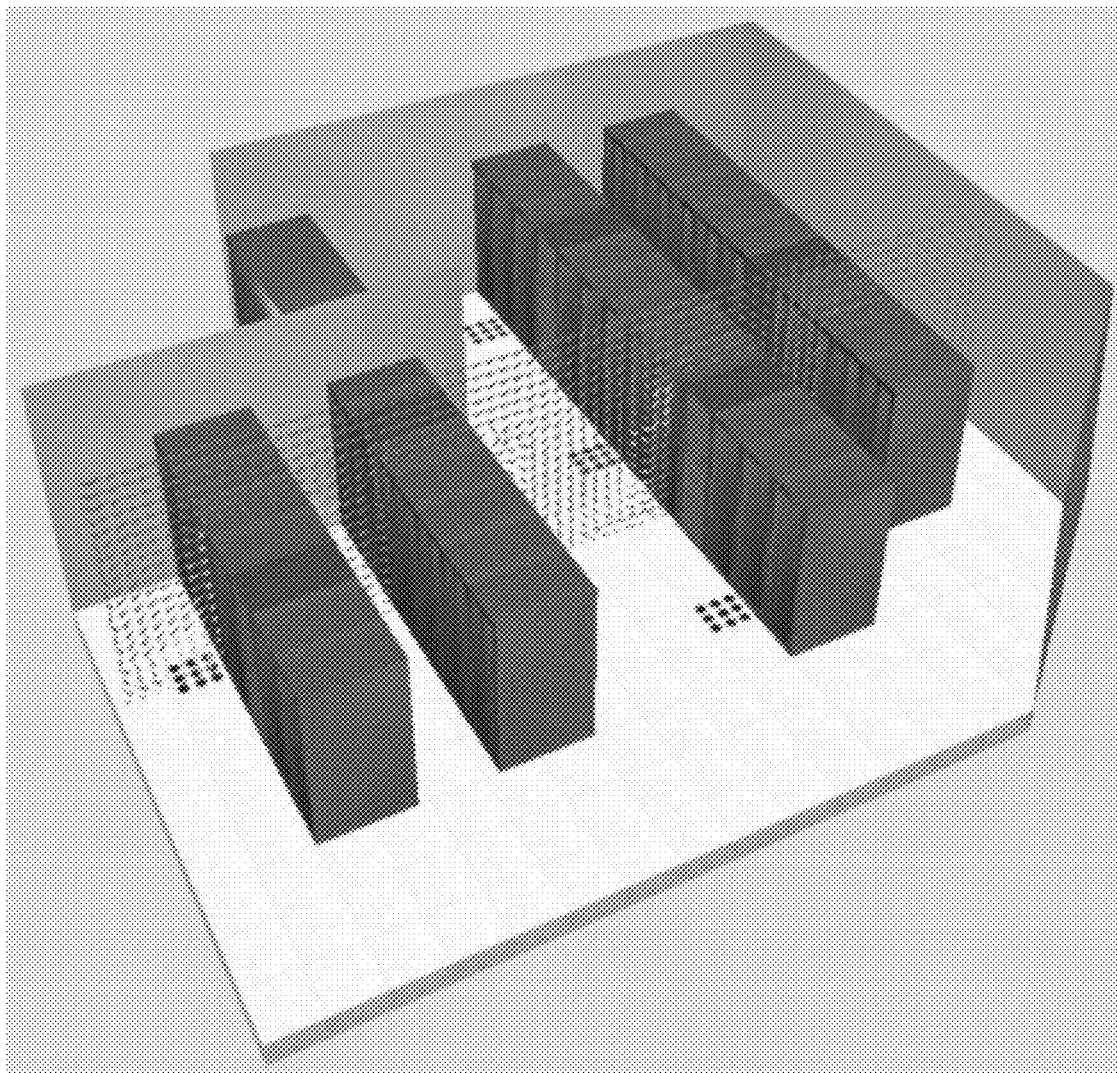
FIG. 11 illustrates another representation of an airflow plane in accordance with one example.

In act 604, the computer system stores the metrics on a computer readable medium. In act 606, the computer system presents the metrics within a display. According to at least one example, the metrics are displayed within a 3-dimensional representation of a data center room along with a planar representation of additional field values (such as temperatures or airflow) that are applicable to a 2-dimensional plane extending across the data center room. FIG. 7 illustrates this example. FIGS. 8 and 9 illustrate plane-based temperature representations that may be displayed by the computer system according to the process 600. FIGS. 10 and 11 illustrate plane-based airflow representations that may be displayed by the computer system according to the process 600.

FIG. 7 displays maximum inlet temperatures 700 for racks and maximum return temperatures 702 for coolers. As illustrated in FIG. 7, object temperature values have been colored to a similar scale as the temperature field values to provide an indication of the quality of room cooling performance and airflow management. By displaying these measures on the objects in the 3D view, examples simplify the experience for users who might otherwise have misinterpreted the flow fields to estimate average temperatures.

Examples described herein provide novel methods and systems for determining airflow within in a data center using PFM. The ability to predict airflow accurately in a data center design or management tool in examples disclosed herein facilitates designing robust cooling systems under different layout configurations. Further, examples facilitate avoiding costly trial-and-error solutions in a facility in attempts to achieve required cooling performance. Still further, better accuracy in airflow predictions results in improved overall data center cooling analysis and can provide a more energy efficient cooling solution. In at least some examples described herein, airflow is described as being generated by a CRAC. Systems and methods described herein can be used with other types of sources of cool air, including other types of cooling devices and fans. In at least some examples, methods are described as determining specific airflows. In at least some examples, the determination is a prediction or estimation of actual airflows.

In at least some examples discussed herein, the performance of assessments and calculations in real-time refers to processes that are completed in a matter of a few seconds or less rather than several minutes or longer as can happen with complex calculations, such as those involving typical CFD calculations.

In at least some examples described above, the design of a data center and/or actual parameters in a data center are altered based on predicted airflow and cooling within a data center. The alterations may be implemented to improve the cooling performance and/or may be implemented to provide cost and/or power savings when the performance is found to be within predetermined specifications. For example, the configuration of the cooling system components may be changed and/or the types of cooling system components may be changed. Further, based on determined airflow values, a data management system in accordance with one example, may control one or more CRACs to adjust the airflow, and in addition, one or more equipment racks can be controlled to reduce power if airflow and cooling associated with the rack is not adequate to provide sufficient cooling. In at least some examples described above, tools and processes are provided for determining airflow and cooling within a data center. In other examples, the tools and processes may be used in other types of facilities, and may also be used in mobile applications, including mobile data centers.

Having thus described several aspects of at least one example, it is to be appreciated various alterations, modifications, and improvements will readily occur to those skilled in the art. Such alterations, modifications, and improvements are intended to be part of this disclosure, and are intended to be within the scope of the examples disclosed herein. Accordingly, the foregoing description and drawings are by way of example only.

What is claimed is:

1. A computer-implemented method for predicting airflow within a data center using a potential flow technique, the method comprising:

receiving, by a computer, data representing a physical layout of at least one data center space;

generating, by the computer, at least one modeled data center space based on the received data;

automatically generating, by the computer, an unstructured grid within the at least one modeled data center space comprising a plurality of unstructured grid cells, each unstructured grid cell of the plurality of unstructured grid cells having a size;

determining, by the computer, airflow velocity values for each unstructured grid cell using airflow velocity potentials;

determining, by the computer, a temperature value for each unstructured grid cell using the airflow velocity values;

determining, by the computer, a concentration value for each unstructured grid cell using the airflow velocity values;

calculating, by the computer, a comparison result indicating whether the concentration values, the airflow velocity values and the temperature values for the plurality of the unstructured grid cells satisfy convergence criteria;

generating a plurality of computational grid cells from the plurality of unstructured grid cells, wherein each computational grid cell of the plurality of computational grid cells has a first size and is associated with the determined airflow velocity value, the determined temperature value, and the determined concentration value;

dividing a subset of computational grid cells of the plurality of computational grid cells into a plurality of visualization cells, wherein each visualization cell of the plurality of visualization cells has a second size less than the first size of a computational grid cell that includes the visualization cell;

calculating, by the computer, a smoothed value for each visualization cell, wherein the smoothed value is at least one of a smoothed airflow velocity value, a smoothed temperature value, and a smoothed concentration value; and displaying, by the computer, an indication of the smoothed value for each visualization cell.

2. The method of claim 1, wherein dividing the subset of computational grid cells into a plurality of visualization cells further includes:

classifying each visualization cell of the plurality of visualization cells as either a boundary cell or an interior cell based on a proximity of the visualization cell to at least one computational grid cell of the subset.

3. The method of claim 2, wherein calculating the smoothed value for each visualization cell includes determining a smoothed value for at least one boundary cell.

4. The method of claim 3, wherein calculating the smoothed value for the at least one boundary cell includes calculating a smoothed value based on an original value of an interior cell adjacent to the at least one boundary cell.

5. The method of claim 4, wherein calculating the smoothed value for the at least one boundary cell includes calculating a smoothed value based on the original value and a value of at least one other grid cell adjacent to the at least one boundary cell.

6. The method of claim 5, wherein calculating the smoothed value for the at least one boundary cell includes calculating a weighted average of the original value and the value of the at least one other grid cell adjacent to the at least one boundary cell, whereby the smoothed value is between the original value and the value of the at least one other grid cell.

7. The method of claim 1, wherein calculating the smoothed value for each visualization cell includes calculating at least one of a predicted airflow velocity value and a predicted temperature value.

8. The method of claim 7, further comprising displaying, in a graphical representation of the data center, at least one of the predicted airflow velocity value and the predicted temperature value in a visualization plane.

9. The method of claim 1, further comprising:
displaying at least one of the smoothed airflow velocity value, the smoothed temperature value, and the smoothed concentration value in a graphical representation of the data center superimposed over at least one of a plurality of racks and a plurality of coolers included in the at least one modeled data center space.

10. The method of claim 1, wherein calculating the comparison result further includes determining the concentration values, the airflow velocity values and the temperature values for the plurality of unstructured grid cells using iterative methods.

11. The method of claim 10, wherein calculating the comparison result further includes performing the iterative methods until the concentration values, the airflow velocity values and the temperature values satisfy the convergence criteria, wherein the convergence criteria includes a difference between a total power value for racks and a load value for coolers, the racks and coolers being located in the data center.

12. A system for predicting airflow within a data center using a potential flow technique, the system comprising: an interface; and a controller coupled to the interface and configured to:
receive data representing a physical layout of at least one data center space;
generate at least one modeled data center space based on the received data;
automatically generate an unstructured grid within the at least one modeled data center space comprising a plurality of unstructured grid cells, each unstructured grid cell of the plurality of unstructured grid cells having a size;
determine airflow velocity values for each unstructured grid cell using airflow velocity potentials;
determine a temperature value for each unstructured grid cell using the airflow velocity values;
determine a concentration value for each unstructured grid cell using the airflow velocity values;
calculate a comparison result indicating whether the concentration values, the airflow velocity values and the temperature values for the plurality of the unstructured grid cells satisfy convergence criteria;
generate a plurality of computational grid cells from the plurality of unstructured grid cells, wherein each computational grid cell of the plurality of computational grid cells has a first size and is associated with the determined airflow velocity value, the determined temperature value, and the determined concentration value;
divide a subset of computational grid cells of the plurality of computational grid cells into a plurality of visualization cells, wherein each visualization cell of the plurality of visualization cells has a second size less than the first size of a computational grid cell that includes the visualization cell;
calculate a smoothed value for each visualization cell, wherein the smoothed value is at least one of a smoothed airflow velocity value, a smoothed temperature value, and a smoothed concentration value: and
display an indication of the smoothed value for each visualization cell.

13. The system of claim 12, wherein the controller is further configured to:
classify each visualization cell of the plurality of visualization cells as either a boundary cell or an interior cell based on a proximity of the visualization cell to at least one computational grid cell of the subset.

14. The system of claim 13, wherein the controller is further configured to determine a smoothed value for at least one boundary cell.

15. The system of claim 14, wherein the controller is further configured to calculate the smoothed value for the at least one boundary cell based on an original value of an interior cell adjacent to the at least one boundary cell.

16. The system of claim 15, wherein the controller is further configured to calculate the smoothed value for the at least one boundary cell based on the original value and a value of at least one other grid cell adjacent to the at least one boundary cell.

17. The system of claim 16, wherein the controller is further configured to calculate a weighted average of the original value and the value of the at least one other grid cell adjacent to the at least one boundary cell, whereby the smoothed value is between the original value and the value of the at least one other grid cell.

18. The system of claim 12, wherein the smoothed value for each visualization cell is at least one of a predicted airflow velocity value and a predicted temperature value.

19. The system of claim 18, wherein the interface is further configured to display, in a graphical representation of the data center, at least one of the predicted airflow velocity value and the predicted temperature value in a visualization plane.

20. The system of claim 12, wherein the interface is further configured to display at least one of the smoothed airflow velocity value, the smoothed temperature value, and the smoothed concentration value in a graphical representation of the data center, wherein the at least one of the smoothed airflow velocity value, the smoothed temperature value, and the smoothed concentration value is superimposed over at least one of a plurality of racks and a plurality of coolers included in the at least one modeled data center space.

21. The system of claim 12, wherein the controller is further configured to calculate the comparison result by determining the concentration values, the airflow velocity values and the temperature values for the plurality of unstructured grid cells using iterative methods until the concentration values, the airflow velocity values and the temperature values satisfy the convergence criteria, wherein the convergence criteria includes a difference between a total power value for racks and a load value for coolers, the racks and coolers being located in the data center.

22. A non-transitory computer-readable medium having stored thereon sequences of instruction including instructions that will cause a processor to:

receive data representing a physical layout of at least one data center space; generate at least one modeled data center space based on the received data;

automatically generate an unstructured grid within the at least one modeled data center space comprising a plurality of unstructured grid cells, each unstructured grid cell of the plurality of unstructured grid cells having a size;

determine airflow velocity values for each unstructured grid cell using airflow velocity potentials;

determine a temperature value for each unstructured grid cell using the airflow velocity values;

determine a concentration value for each unstructured grid cell using the airflow velocity values;

calculate a comparison result indicating whether the concentration values, the airflow velocity values and the temperature values for the plurality of the unstructured grid cells satisfy convergence criteria;

generate a plurality of computational grid cells from the plurality of unstructured grid cells, wherein each computational grid cell of the plurality of computational grid cells has a first size and is associated with the determined airflow velocity value, the determined temperature value, and the determined concentration value;

divide a subset of computational grid cells of the plurality of computational grid cells into a plurality of visualization cells, wherein each visualization cell of the plurality of visualization cells has a second size less than the first size of a computational grid cell that includes the visualization cell;

calculate a smoothed value for each visualization cell, wherein the smoothed value is at least one of a smoothed airflow velocity value, a smoothed temperature value, and a smoothed concentration value; and display an indication of the smoothed value for each visualization cell.

* * * * *